(12) United States Patent
Sawada et al.

(10) Patent No.: US 9,329,307 B2
(45) Date of Patent: May 3, 2016

(54) METHOD FOR PRODUCING POLARIZER

(71) Applicant: NITTO DENKO CORPORATION, Ibaraki-shi, Osaka (JP)

(72) Inventors: Hiroaki Sawada, Ibaraki (JP); Takeharu Kitagawa, Ibaraki (JP); Takashi Kamijo, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 33 days.

(21) Appl. No.: 13/933,055

(22) Filed: Jul. 1, 2013

(65) Prior Publication Data

US 2014/0044947 A1 Feb. 13, 2014

Related U.S. Application Data

(62) Division of application No. 13/318,415, filed as application No. PCT/JP2010/057542 on Apr. 28, 2010.

(30) Foreign Application Priority Data

May 1, 2009 (JP) .................................. 2009-111678
May 20, 2009 (JP) .................................. 2009-122365
Apr. 26, 2010 (JP) .................................. 2010-100528

(51) Int. Cl.
*G02B 1/08* (2006.01)
*C08J 5/18* (2006.01)
(Continued)

(52) U.S. Cl.
CPC ... *G02B 1/08* (2013.01); *C08J 5/18* (2013.01); *C08J 7/04* (2013.01); *G02B 5/3033* (2013.01); *B32B 2457/202* (2013.01); *C08J 2385/04* (2013.01); *C08J 2429/04* (2013.01); *Y10T 428/265* (2015.01)

(58) Field of Classification Search
None
See application file for complete search history.

(56) References Cited

U.S. PATENT DOCUMENTS 3,985,849 A * 10/1976 Notomi et al. ................ 264/567
7,233,563 B2 * 6/2007 Ueki et al. ............... 369/112.03
7,289,266 B1 * 10/2007 Kamijo et al. ........... 359/487.02

(Continued)

FOREIGN PATENT DOCUMENTS

CN    1826542 A    8/2006
CN    1926452 A    3/2007

(Continued)

OTHER PUBLICATIONS

Korean Office Action for application No. 10-2011-7026141 dated May 30, 2014.

(Continued)

*Primary Examiner* — Gwendolyn Blackwell
*Assistant Examiner* — Anthony J Frost
(74) *Attorney, Agent, or Firm* — Hauptman Ham, LLP

(57) ABSTRACT

A method for producing a polarizer (20) comprises the steps of: (A) stretching a polyvinyl alcohol-based resin layer (10) to obtain a stretched layer (14); (B) immersing the stretched layer (14) in a dyeing liquid (23) containing iodine to obtain a dyed layer (18) in which absorbance thereof determined from a tristimulus value Y is from 0.4 to 1.0 (transmittance T=40% to 10%); and (C) removing a part of iodine adsorbed in the dyed layer (18) so that the absorbance of the dyed layer (18) decreases by 0.03 to 0.7, provided that the absorbance of the dyed layer (18) is controlled so that it does not become less than 0.3.

7 Claims, 5 Drawing Sheets

(51) Int. Cl.
*C08J 7/04* (2006.01)
*G02B 5/30* (2006.01)

(56) References Cited

U.S. PATENT DOCUMENTS

| | | |
|---|---|---|
| 2005/0243245 A1 | 11/2005 | Taguchi et al. |
| 2008/0231793 A1 | 9/2008 | Futamura |
| 2009/0091826 A1 | 4/2009 | Sugino |

FOREIGN PATENT DOCUMENTS

| | | |
|---|---|---|
| GB | 599794 | 5/1943 |
| GB | 615890 | 12/1943 |
| JP | 05273412 | 10/1993 |
| JP | 2003043257 | 2/2003 |
| JP | 20033270440 | 9/2003 |
| JP | 2005242044 | 9/2005 |
| JP | 2005-284246 A | 10/2005 |
| JP | 2007052404 | 3/2007 |
| JP | 2007206138 | 8/2007 |
| JP | 2009093074 | 4/2009 |
| JP | 2011150313 A | 8/2011 |
| JP | 2011227450 A | 11/2011 |
| TW | 200500688 A | 1/2005 |
| TW | 200708777 | 3/2007 |
| WO | 2010/071093 A1 | 6/2010 |

OTHER PUBLICATIONS

Taiwanese Notice of Allowance for application No. 102115075 dated Sep. 5, 2013.
Korean Office Action for application No. 10-2013-7016512 dated Oct. 16, 2013.
Chinese Office Action for application No. 201310172585.0 dated Mar. 31, 2014.
International Search Report for PCT/JP2010/057542, dated Jun. 8, 2010.
European Search Report for 13171112.9 dated Jul. 26, 2013.
European Search Report for 10769776.5 dated Jul. 26, 2013.
Shusaku Goto, Experimental Report, Test Report, Oct. 1, 2014, pp. 1-22, Nitto Denko Corporation, Hiroshima, Japan.
English translation of relevant portion of the argument for responding to Japanese Office Action of JP2014-002095.
Japanese Office Action for application No. 2014-002095 dated Oct. 20, 2014.
Taiwanese Office Action for application No. TW102128689 mailed Mar. 20, 2015.
Chinese Office Action for application No. CN201310279318.3 mailed Feb. 4, 2015.
Chinese Search Report for application No. CN201310279318.3 mailed Jan. 15, 2015.

* cited by examiner

METHOD FOR PRODUCING POLARIZER

CROSS-REFERENCE TO RELATED APPLICATIONS

The present application is a Divisional application of U.S. Ser. No. 13/318,415 filed Nov. 1, 2011, which is a National Phase application of International application number PCT/JP2010/057542 filed on Apr. 28, 2010, which claims priority of Japanese Patent Application Nos. 2010-100528, filed on Apr. 26, 2010; 2009-122365, filed May 20, 2009; 2009-111678, filed May 1, 2009, which is incorporated herein by reference in its entirety.

TECHNICAL FIELD OF THE INVENTION

The present invention relates to a method for producing a polarizer including a polyvinyl alcohol-based resin layer containing iodine.

BACKGROUND ART

There has been known a production method in which a polyvinyl alcohol film is dyed with a dyeing liquid containing iodine and then stretched to obtain a polarizer (for example, JP-A-2003-270440). In the above-mentioned production method, the thus dyed and stretched film is subjected to an iodine ion impregnation treatment by immersing in an aqueous potassium iodide solution, and then subjected to an alcohol liquid immersion treatment by immersing in an alcohol liquid.

The polarizer obtained by this production method exhibits less yellowness and is less likely to cause a change in color hue even under a heating environment. The reason why the polarizer exhibits less yellowness is that absorbance thereof is nearly constant in the entire wavelength range of visible light.

However, the above-mentioned polarizer has a problem such as a low polarization degree.

SUMMARY OF THE INVENTION

There has been known, as a method of obtaining a polarizer, a method in which a polyvinyl alcohol film is dyed with a dyeing liquid containing iodine, stretched, subjected to an iodine ion impregnation treatment by immersing in an aqueous potassium iodide solution, and then subjected to an alcohol liquid immersion treatment by immersing in an alcohol liquid. However, the polarizer obtained by this production method has a problem such as a low polarization degree.

The present invention provides a production method capable of obtaining a polarizer including a polyvinyl alcohol-based resin layer containing iodine, which has a high polarization degree.

Means for Solving the Problems

The summary of the present invention is as follows.

In a first preferred aspect of the present invention, there is provided a method for producing a polarizer including a polyvinyl alcohol-based resin layer having a layer thickness of 0.6 μm to 5 μm, and containing iodine. The production method of the present invention includes the steps of:

(A) stretching a polyvinyl alcohol-based resin layer to obtain a stretched layer;

(B) immersing the stretched layer in a dyeing liquid containing iodine to obtain a dyed layer in which absorbance thereof determined from a tristimulus value Y is from 0.4 to 1.0 (transmittance T=40% to 10%); and (C) removing a part of iodine adsorbed in the dyed layer so that the absorbance of the dyed layer decreases by 0.03 to 0.7, provided that the absorbance of the dyed layer is controlled so that it does not become less than 0.3.

In a second preferred aspect of the method according to the present invention, the polyvinyl alcohol-based resin layer is formed on a support and the polyvinyl alcohol-based resin layer is stretched together with the support in the step A.

In a third preferred aspect of the method according to the present invention, the stretching method is dry stretching in the step A.

In a fourth preferred aspect of the method according to the present invention, the temperature at the time of stretching (stretching temperature) is from 130° C. to 170° C. in the step A.

In a fifth preferred aspect of the method according to the present invention, the absorbance is from 0.4 to 1.0 (T=40% to 10%) when the dyed layer has a layer thickness of 0.6 μm to 5 μm in the step B.

In a sixth preferred aspect of the method according to the present invention, the dyeing liquid is an aqueous solution containing iodine and alkali iodide or ammonium iodide in the step B.

In a seventh preferred aspect of the method according to the present invention, a part of iodine adsorbed in the dyed layer is removed by immersing the dyed layer in a decolorization liquid containing alkali iodide or ammonium iodide in the step C.

In an eighth preferred aspect of the method according to the present invention, the polarizer has an absorbance of 0.3 to 0.4 (T=50% to 40%) at the time point of completion of the step C.

In a ninth preferred aspect, the method according to the present invention further includes a step of immersing the dyed layer or the dyed layer partially decolorized in a crosslinking liquid containing boric acid and alkali iodide or ammonium iodide.

In a tenth preferred aspect, the method according to the present invention further includes a step of drying the polarizer.

The present inventors have intensively studied so as to achieve the above-mentioned object and found that a polarizer having a high polarization degree is obtained by sequentially subjecting to the following three steps A to C. The respective steps will be described with reference to FIGS. 1 and 2. FIGS. 1 and 2 show the case where a polyvinyl alcohol-based resin layer is formed on a support and the polyvinyl alcohol-based resin layer is stretched together with the support.

FIG. 1(a) is a schematic sectional view of a polyvinyl alcohol-based resin layer 10 before stretching formed on a support 30. The polyvinyl alcohol-based resin layer 10 is composed of an amorphous portion 11 and a crystallized portion 12. The crystallized portion 12 exists at random in the amorphous portion 11. Arrow 13 shows a stretch direction in the subsequent step.

[Step A] Stretching Before Dyeing

First, the polyvinyl alcohol-based resin layer 10 is stretched together with a support 30. The polyvinyl alcohol-based resin layer 10 is referred to as a stretched layer 14 after stretching. FIG. 1(b) is a schematic sectional view of the stretched layer 14. A first point in the production method of the present invention is that the polyvinyl alcohol-based resin layer 10 is stretched before dyeing. Arrow 15 shows a stretch direction. A polymer chain (not shown) in the stretched layer 14 is crystallized by stretching to form a crystallized portion 17 having higher orientation property in an amorphous portion 16.

[Step B] Excessive Dyeing

Then, the stretched layer 14 is dyed. Dyeing is an adsorption treatment of iodine. The stretched layer 14 is referred to as a dyed layer 18 after dyeing. FIG. 2(c) is a schematic sectional view of the dyed layer 18. A second point in the production method of the present invention is that the stretched layer 14 is immersed in a dyeing liquid containing iodine and excessively dyed. Excessive dyeing means that dyeing is carried out so that an absorbance $A_B$ determined from a tristimulus value Y becomes 0.4 or more. A subscript B of the absorbance $A_B$ represents the step B.

A common polarizer has an absorbance A, which is determined from the tristimulus value Y, of about 0.37. For example, a polarizer with a transmittance T of 43% has an absorbance A of 0.367. Therefore, it is supposed that dyeing which enables an absorbance $A_B$ of 0.4 or more, like dyeing in the present invention, is excessive dyeing.

The crystallized portion 17 of the polymer chain is not easily dyed as compared with the amorphous portion 16. However, it is also possible to sufficiently adsorb iodine to the crystallized portion 17 by excessively dyeing the stretched layer 14. The adsorbed iodine forms a polyiodine ion complex 19 of $I^{3-}$ or $I^{5-}$ or the like in the dyed layer 18. The polyiodine ion complex 19 exhibits absorption dichroism in a visible light range (wavelength of 380 nm to 780 nm).

[Step C] Decolorization (Partial Removal of Iodine)

Next, a part of iodine adsorbed to the dyed layer 18 is removed. This operation is referred to as decolorization. The dyed layer 18 is referred to as a polarizer 20 after decolorization. The iodine is adsorbed to the dyed layer 18 in the form of the polyiodine ion complex 19. FIG. 2(d) is a schematic sectional view of the polarizer 20. A third point in the production method of the present invention is that a part of the polyiodine ion complex 19 is removed from the excessively dyed layer 18. In order to remove the polyiodine ion complex 19 from the dyed layer 18, for example, the dyed layer 18 is immersed in an aqueous potassium iodide solution (decolorization liquid). At this time, the polyiodine ion complex 19 is removed so that the absorbance $A_C$ decreases by 0.03 to 0.7, provided that the absorbance of the dyed layer is controlled so that it does not become less than 0.3. A subscript C of the absorbance $A_C$ represents the step C.

When the polyiodine ion complex 19 is removed, the polyiodine ion complex 19 adsorbed to the amorphous portion 16 is preferentially removed. As a result, the polyiodine ion complex 19 adsorbed to the crystallized portion 17 remains in a relatively large amount.

The polyiodine ion complex 19 adsorbed to the amorphous portion 16 slightly contributes to absorption dichroism. On the other hand, the polyiodine ion complex 19 adsorbed to the crystallized portion 17 largely contributes to absorption dichroism. However, the polyiodine ion complex 19 adsorbed to the amorphous portion 16 and the polyiodine ion complex 19 adsorbed to the crystallized portion 17 increase the absorbance, in the same way. According to the production method of the present invention, it is possible to preferentially remove the polyiodine ion complex 19 adsorbed to the amorphous portion 16, which increases the absorbance regardless of small contribution to absorption dichroism. Therefore, the amount of the polyiodine ion complex 19 adsorbed to the crystallized portion 17, which largely contributes to absorption dichroism, relatively increases. Large contribution to absorption dichroism means a high polarization degree. Thus, according to the production method of the present invention, it is possible to obtain a polarizer 20 having a high polarization degree regardless of low absorbance.

Advantage of the Invention

According to the production method of the present invention, the amount of the polyiodine ion complex 19 adsorbed to the crystallized portion 17, which largely contributes to absorption dichroism, increases, thus obtaining a polarizer 20 having a high polarization degree regardless of low absorbance.

DESCRIPTION OF THE PREFERRED EMBODIMENTS

[Production Method of the Present Invention]

Figure 1:
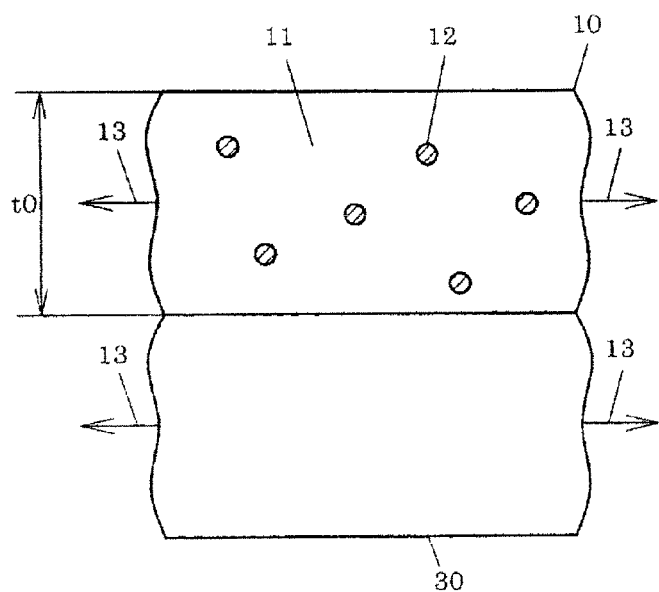
FIG. 1(a) is a schematic view showing a preliminary step of production step of the present invention.
FIG. 1(b) is a schematic view showing a production step A of the present invention.
Figure 1:
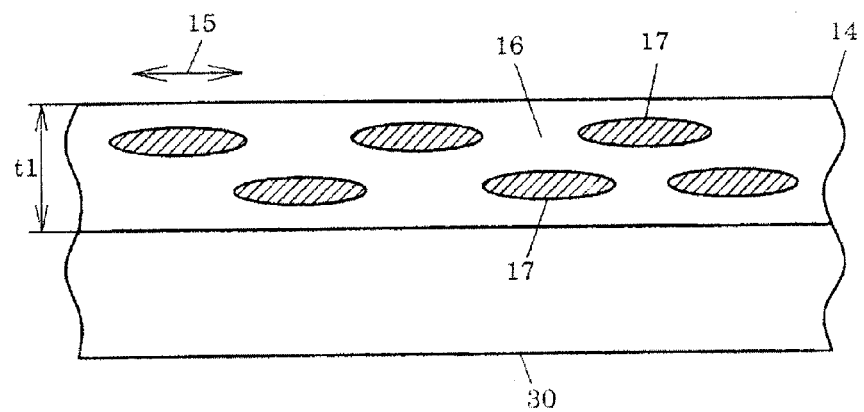
Figure 2:
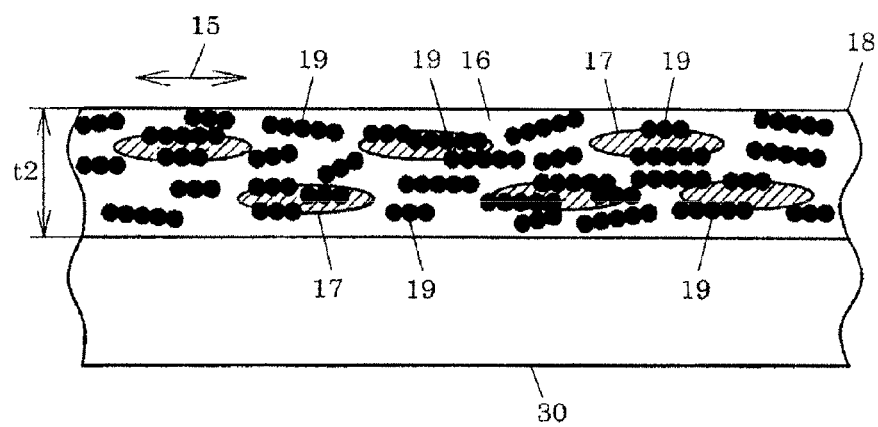
FIG. 2(c) is a schematic view showing a production step B of the present invention.
FIG. 2(d) is a schematic view showing a production step C of the present invention.
Figure 2:
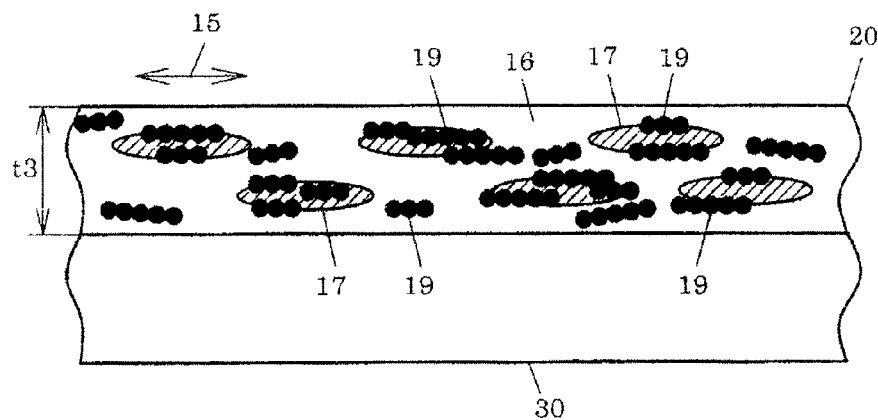
Figure 3:
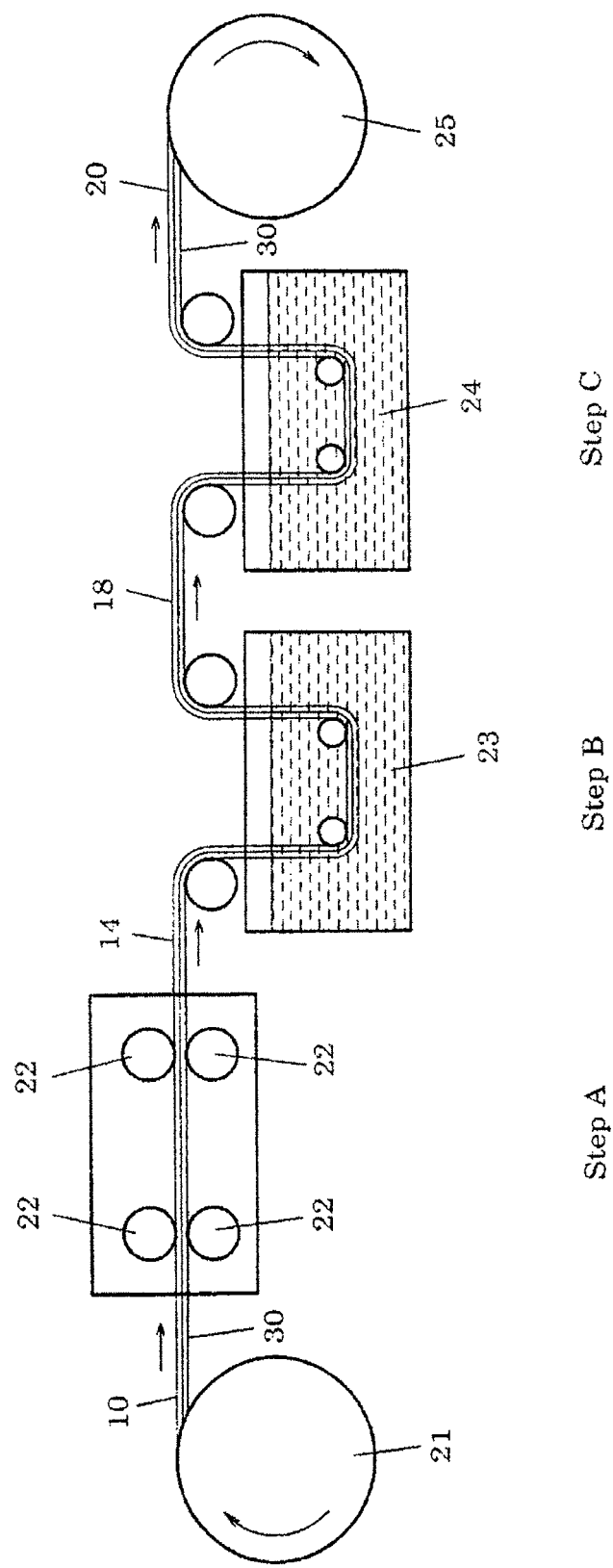
FIG. 3 is a schematic view showing a production step of the present invention.

FIG. 3 is a schematic view showing a production step of the present invention. The production method of the present invention is a method for producing a polarizer 20 including a polyvinyl alcohol-based resin layer containing iodine.

A film-shaped untreated polyvinyl alcohol-based resin layer 10 formed on a support 30 is sequentially pulled out from a feed portion 21, together with the support 30, for a treatment.

In the step A, the polyvinyl alcohol-based resin layer 10 is stretched while passing through stretch rolls 22, together with the support 30, to form a stretched layer 14.

In the step B, the stretched layer 14 is immersed in a dyeing liquid 23 containing iodine to form a dyed layer 18. The dyed layer 18 has an absorbance $A_B$, which is determined from the tristimulus value Y, of 0.4 to 1.0 (T=40% to 10%).

In the step C, the dyed layer 18 is immersed in a decolorization liquid 24 (aqueous potassium iodide solution) thereby removing a part of iodine to form a polarizer 20. At this time, the absorbance $A_C$ of the polarizer 20 decreases by 0.03 to 0.7 as compared with the absorbance $A_B$ of the dyed layer 18 immediately before the step C, provided that the absorbance of the dyed layer is controlled so that it does not become less than 0.3.

The thus completed polarizer 20 is wound around a take-up portion 25.

The production method of the present invention may include the other steps as long as it includes the above-mentioned steps A, B and C in this order. Examples of the other steps include a step in which the dyed layer 18 is immersed in a crosslinking liquid (aqueous solution containing boric acid and, optionally, potassium iodide) between the step B and the step C thereby crosslinking the polyvinyl alcohol-based resin layer, and the step of drying the polarizer 20 obtained in the step C.

[Step A]

The step A to be used in the present invention is a step of stretching the polyvinyl alcohol-based resin layer 10 to obtain the stretched layer 14.

The polyvinyl alcohol-based resin layer 10 to be used in the present invention is obtained by forming a polyvinyl alcohol-based resin into the form of a layer. The polyvinyl alcohol-based resin layer 10 is preferably formed on the support 30.

The polyvinyl alcohol-based resin is typically obtained by saponifying a polyvinyl acetate-based resin. The polyvinyl alcohol-based resin to be used in the present invention is, for example, polyvinyl alcohol or an ethylene-vinyl alcohol copolymer. The saponification degree of the polyvinyl alcohol-based resin to be used in the present invention is preferably from 85 mol % to 100 mol %, more preferably from 95 mol % to 100 mol %, and still more preferably from 98 mol % to 100 mol %, since water resistance is enhanced and it becomes possible to stretch at a high stretch ratio. The polymerization degree of the polyvinyl alcohol-based resin to be used in the present invention is preferably from 1,000 to 10,000 since it is possible to increase the polarization degree by increasing the amount of the polyiodine ion complex adsorbed to the crystallized portion 17.

It is possible to use, as a method of stretching the polyvinyl alcohol-based resin layer 10, any known stretching methods such as a roll stretching method and a tenter stretching method. The stretch ratio of the polyvinyl alcohol-based resin layer 10 is usually from 3 to 7 times larger than the original length.

Stretching of the polyvinyl alcohol-based resin layer 10 is preferably dry stretching. Dry stretching is stretching in air. Dry stretching is preferable than wet stretching since it can increase the crystallization degree. In this case, the stretching temperature is preferably from 80° C. to 170° C., and more preferably from 130° C. to 170° C. It is possible to accelerate the crystallization of a polymer chain in the polyvinyl alcohol-based resin layer 10 by setting the stretching temperature to 130° C. or higher. As a result, it is possible to increase the amount of the polyiodine ion complex 19 adsorbed to the crystallized portion 17, and thus the polarization degree can be increased. It is also possible to prevent the crystallization of a polymer chain from excessively promoting and to shorten the dyeing time in the step B by setting the stretching temperature to 170° C. or lower. The polyvinyl alcohol-based resin layer 10 is preferably stretched so that the crystallization degree after stretching becomes 20% to 50%, and more preferably 32% to 50%. When the crystallization degree after stretching is from 20% to 50%, the amount of the polyiodine ion complex 19 adsorbed to the crystallized portion 17 increases, and thus the polarization degree can be increased.

The polyvinyl alcohol-based resin layer 10 may contain other additives, in addition to iodine. Examples of the other additives include, surfactants, antioxidants, crosslinking agents and the like.

The polyvinyl alcohol-based resin layer 10 before stretching has a layer thickness $t_0$ of usually 2 µm to 30 µm, and preferably 3 µm to 15 µm. Since the polyvinyl alcohol-based resin layer 10 has a thin layer thickness before stretching, in the case where it is difficult to stretch alone, the polyvinyl alcohol-based resin layer 10 is formed on the support 30 and the polyvinyl alcohol-based resin layer 10 is stretched, together with the support 30.

The stretched layer 14 has a layer thickness $t_1$ of usually 0.4 µm to 7 µm, and preferably 0.6 µm to 5 µm. When the stretched layer 14 has a layer thickness $t_1$ of 5 µm or less, it is possible to achieve the objective absorbance by dyeing within a short time.

[Step B]

In the step B to be used in the present invention, the stretched layer 14 obtained in the step A is immersed in the dyeing liquid 23 containing iodine to obtain the dyed layer 18. The dyed layer 18 has an absorbance $A_B$ of preferably 0.4 to 1.0 (T=40% to 10%). The dyed layer 18 has an absorbance $A_B$ of more preferably 0.5 to 1.0 (T=31.6% to 10%). When the dyed layer 18 has an absorbance $A_B$ of less than 0.4 (case where T is more than 40%), the polyiodine ion complex 19 may not be sometimes adsorbed sufficiently to the crystallized portion 17 of the polymer chain.

In the present invention, the absorbance A is calculated by the equation (1):

$$A=\log_{10}(1/T) \tag{1}$$

wherein the transmittance T is a value of the tristimulus value Y of the XYZ colorimetric system based on a two-degree view field in accordance with the JIS Z 8701 (1995). In the present specification, a value of the transmittance T is represented by a percentage assuming that it is 100% when T=1.

The absorbance $A_B$, which is determined from the tristimulus value Y, of the dyed layer 18 may vary if it falls within a defined range (0.4 to 1.0) immediately after the step B.

The dyeing liquid 23 to be used in the present invention is usually an aqueous solution containing iodine and alkali iodide or ammonium iodide. In the dyeing liquid 23, alkali iodide or ammonium iodide is used so as to enhance solubility of iodine in water. The content of iodide of the dyeing liquid 23 is preferably from 1.1 parts by weight to 5 parts by weight based on 100 parts by weight of water. When potassium iodide is used as alkali iodide, the content of potassium iodide of the dyeing liquid 23 is preferably from 3 parts by weight to 30 parts by weight based on 100 parts by weight of water.

The temperature and immersion time of the dyeing liquid 23 are appropriately set so as to satisfy properties defined in the present invention depending on the concentration of the dyeing liquid 23 and the layer thickness of the stretched layer 14. The temperature of the dyeing liquid 23 is preferably from 20° C. to 40° C. The time of immersion in the dyeing liquid 23 is preferably from 60 seconds to 1,200 seconds.

[Step C]

In the step C to be used in the present invention, a part of the polyiodine ion complex 19 is removed from the dyed layer 18 obtained in the step B to obtain the polarizer 20. The absorbance $A_C$ of the polarizer 20 is controlled to the value which is 0.03 to 0.7 less than the absorbance $A_B$ of the dyed layer 18 by removing the polyiodine ion complex 19. Provided that the absorbance $A_B$ of the dyed layer is controlled so that it does not become less than 0.3.

The polarizer 20 has an absorbance $A_C$, which is determined from the tristimulus value Y, of preferably 0.3 to 0.4 (T=50% to 40%). In order to obtain the absorbance $A_C$ within the above-mentioned range, the width $\Delta A$ ($=A_B-A_C$) of a decrease in absorbance in the step C is preferably from 0.03 to 0.7. The width $\Delta A$ of a decrease in absorbance in the step C is more preferably from 0.05 to 0.65. When the width $\Delta A$ of a decrease in absorbance is less than 0.03, a polarizer 20 having a high polarization degree may not be sometimes obtained.

When a part of the polyiodine ion complex 19 is removed from the dyed layer 18, for example, an aqueous solution of alkali iodide or ammonium iodide is used. The aqueous solution of alkali iodide or ammonium iodide used for this purpose is referred to as a decolorization liquid 24. The treatment of removing a part of the polyiodine ion complex 19 from the dyed layer 18 is referred to as decolorization. Decolorization may be carried out by immersing the dyed layer 18 in the decolorization liquid 24, or the decolorization liquid may be applied or sprayed on a surface of the dyed layer 18.

In the decolorization liquid 24, the polyiodine ion complex 19 is apt to elute from the dyed layer 18 by an action of iodine ions. Iodine ions are obtained from alkali iodides such as potassium iodide, sodium iodide, lithium iodide, magnesium iodide and calcium iodide. Alternatively, iodine ions are obtained from ammonium iodide. It is preferred that the concentration of iodine ions in the decolorization liquid 24 is sufficiently less than that of the dyeing liquid 23. When potassium iodide is used, the content of potassium iodide in the decolorization liquid 24 is preferably from 1 part by weight to 20 parts by weight based on 100 parts by weight of water.

The temperature and immersion time of the decolorization liquid 24 are appropriately set according to the layer thickness of the dyed layer 18. The temperature of the decolorization liquid 24 is preferably from 45° C. to 75° C. The immersion time in the decolorization liquid 24 is preferably from 20 seconds to 600 seconds.

[Polarizer Obtained by the Production Method of the Present Invention]

The polarizer 20 obtained by the production method of the present invention includes a polyvinyl alcohol-based resin layer containing iodine. The above-mentioned polyvinyl alcohol-based resin layer is stretched and dyed, and thus polymer chains are oriented in a given direction. Iodine forms the polyiodine ion complex 19 such as $I^{3-}$ or $I^{5-}$ in the polyvinyl alcohol-based resin layer and exhibits absorption dichroism within a visible light range (wavelength 380 nm to 780 nm).

The film thickness $t_3$ of the polarizer 20 is usually the same as the layer thickness $t_1$ of the stretched layer 14 and is usually from 0.4 μm to 7 μm, and preferably from 0.6 μm to 5 μm.

According to the production method of the present invention, it is possible to adjust the polarization degree of the polarizer 20 having an absorbance $A_C$ of about 0.37 (T=43%) and a film thickness $t_3$ of 5 μm or less to 99.9% or more.

EXAMPLES

Example 1

(1) An aqueous 7% by weight solution of polyvinyl alcohol was applied on a surface of a support made of a norbornene-based resin film having a film thickness of 150 μm (manufactured by JSR Corporation; product name: ARTON) to form a polyvinyl alcohol film. The polymerization degree of polyvinyl alcohol was 4,200, and the saponification degree thereof was 99% or more.

(2) The polyvinyl alcohol film and the support were dried at 80° C. for 8 minutes to form a polyvinyl alcohol layer having a layer thickness of 7 μm on the support to obtain a laminate of the polyvinyl alcohol layer and the support.

(3) Using a biaxial stretching machine manufactured by Iwamoto Seisakusho Co., Ltd., the laminate of the polyvinyl alcohol layer and the support was subjected to dry uniaxial stretching. The stretching temperature was 150° C. The stretch ratio was adjusted to the value which is 4.8 times larger than the original length. As a result of stretching, a laminate of the stretched layer and the support was obtained. The support is also stretched at the same ratio as that of the stretched layer.

(4) The laminate of the stretched layer and the support was immersed in a dyeing liquid of an aqueous solution containing iodine and potassium iodide thereby adsorbing and orienting a polyiodine ion complex to the stretched layer to obtain a laminate of the dyed layer and the support. The immersion time in the dyeing liquid was 600 seconds. The liquid temperature of the dyeing liquid was 25° C. The composition of the dyeing liquid was as follows: iodine:potassium iodide:water=1.1:7.8:100 in term of a weight ratio. Immediately after dyeing, the absorbance was 0.602.

(5) The laminate of the dyed layer and the support was immersed in a decolorization liquid containing potassium iodide and a part of the polyiodine ion complex of the dyed layer was removed. The composition of the decolorization liquid was as follows: water:potassium iodide=100:5.3 in terms of a weight ratio. The liquid temperature of the decolorization liquid was 60° C. The immersion time in the decolorization liquid was adjusted and five kinds of samples of the obtained polarizer having an absorbance of 0.357 to 0.377 were made.

(6) A laminate of the dyed layer partially decolorized and the support was immersed in a crosslinking liquid containing boric acid and potassium iodide. The composition of the crosslinking liquid was as follows: water:boric acid:potassium iodide=100:11.8:5.9 in terms of a weight ratio. The immersion time in the crosslinking liquid was 60 seconds. The liquid temperature of the crosslinking liquid was 60° C.

(7) A laminate of the dyed layer subjected to a crosslinking treatment and the support was dried at 60° C. for 120 seconds.

Figure 4:
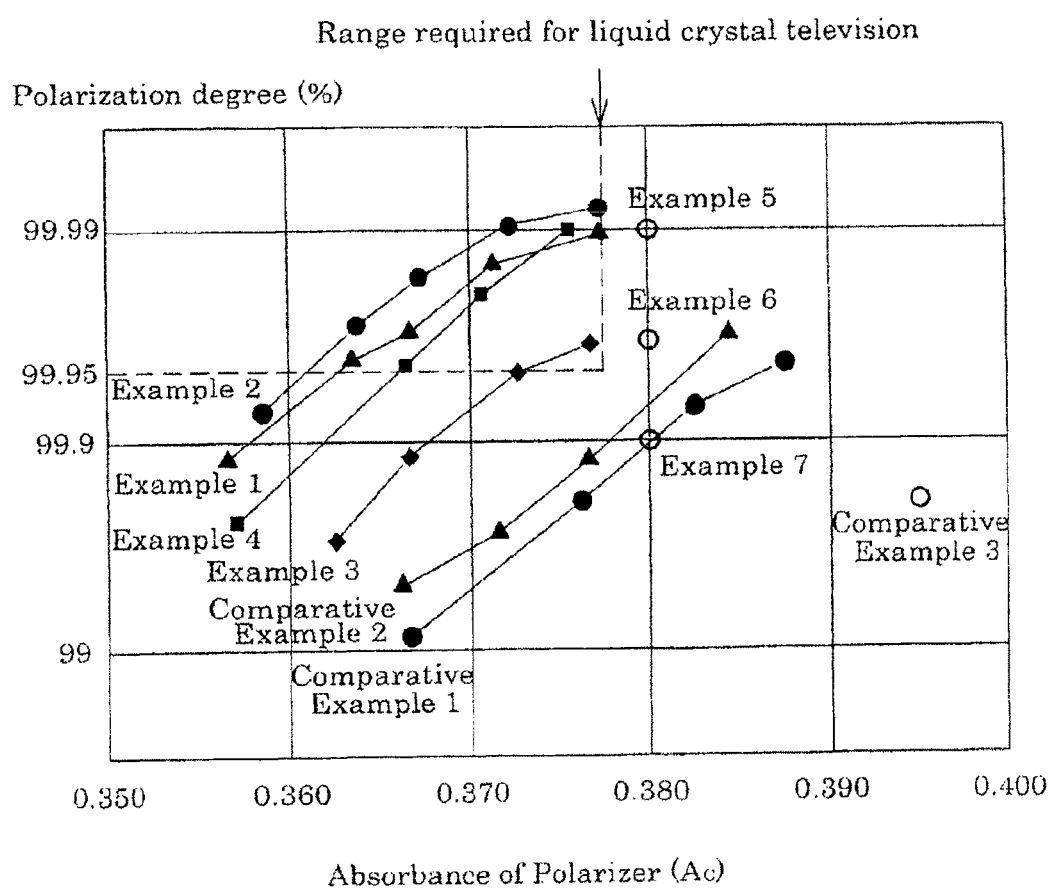
FIG. 4 is a graph of absorbance versus polarization degree of a polarizer.
Figure 5:
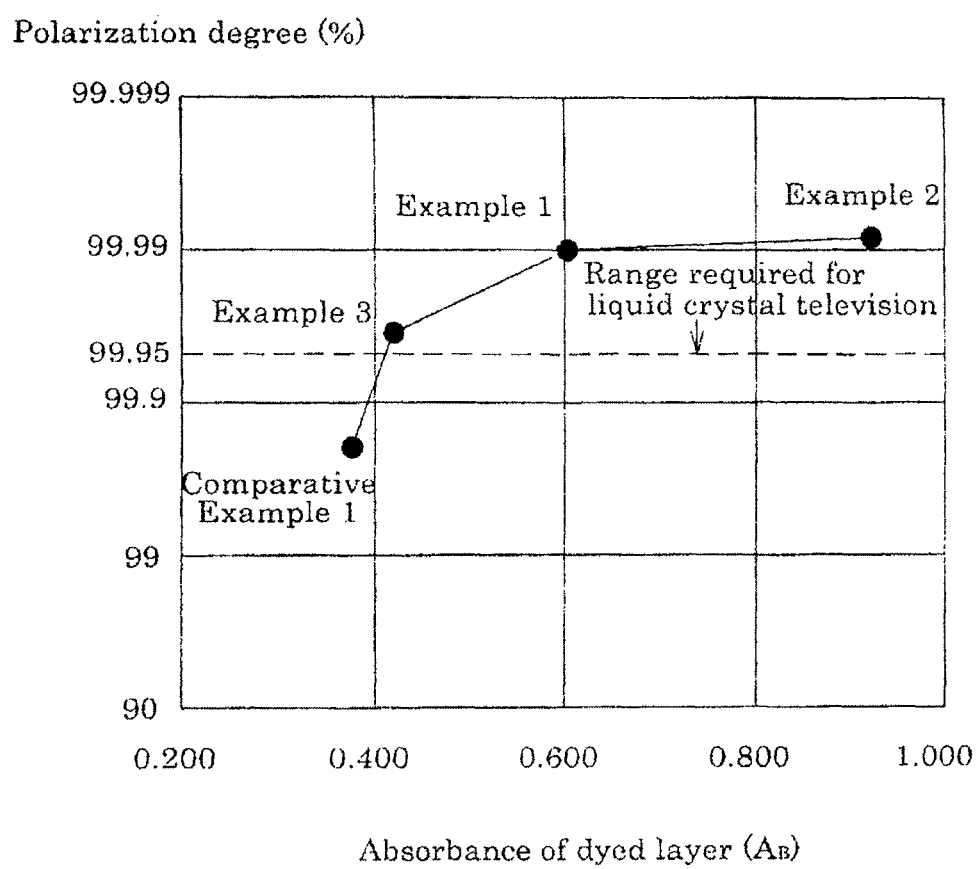
FIG. 5 is a graph of absorbance versus polarization degree of a dyed layer.

The laminate of a polarizer (film thickness of 2.9 μm) and the support was formed by the above-mentioned procedure. A graph of the absorbance ($A_C$) versus polarization degree of the polarizer is shown in FIG. 4. A graph of the absorbance ($A_B$) versus polarization degree of the dyed layer is shown in FIG. 5.

Example 2

A laminate composed of a polarizer (thickness: 2.9 μm) and a support was formed in the same manner as in Example 1 except for the following points:

(1) The immersion time in the dyeing liquid was adjusted to set an absorbance at 0.921 immediately after dyeing.

(2) The immersion time in the decolorization liquid was adjusted to prepare five kinds of samples of the obtained polarizer having an absorbance of 0.359 to 0.377.

FIG. 4 is a graph of absorbance ($A_C$) versus polarization degree of a polarizer. And FIG. 5 is a graph of absorbance ($A_B$) versus polarization degree of a dyed layer.

Example 3

A laminate composed of a polarizer (thickness: 2.9 μm) and a support was formed in the same manner as in Example 1 except for the following points:

(1) The immersion time in the dyeing liquid was adjusted to set an absorbance at 0.420 immediately after dyeing.

(2) The immersion time in the decolorization liquid was adjusted to prepare four kinds of samples of the obtained polarizer having an absorbance of 0.362 to 0.377.

FIG. 4 is a graph of absorbance ($A_C$) versus polarization degree of a polarizer. And FIG. 5 is a graph of absorbance ($A_B$) versus polarization degree of a dyed layer.

Example 4

A laminate composed of a polarizer (thickness: 2.9 μm) and a support was formed in the same manner as in Example 1 except for the following points:

(1) The immersion time in the dyeing liquid was adjusted to set an absorbance at 0.959 immediately after dyeing.

(2) The immersion time in the decolorization liquid was adjusted to prepare four kinds of samples of the obtained polarizer having an absorbance of 0.357 to 0.376.

(3) The stretching temperature was 100° C. and the stretch ratio was 4.5 times larger than the original length.

FIG. 4 is a graph of absorbance ($A_C$) versus polarization degree of a polarizer Example 5

A laminate composed of a polarizer (thickness: 3.5 μm) and a support was formed in the same manner as in Example 1 except for the following points:

(1) An aqueous 5% by weight solution of polyvinyl alcohol was applied onto a surface of the support.

(2) The stretching temperature of the laminate was 140° C. and the stretch ratio was 4.0 larger than the original length.

(3) The composition of the dyeing liquid was as follows: iodine:potassium iodine:water=1:7:92 in terms of a weight ratio. The immersion time in the dyeing liquid was 300 seconds.

(4) The absorbance immediately after dyeing was 0.613.

(5) The content of potassium iodide of the decolorization liquid was as follows: water:potassium iodine=95:5 in terms of a weight ratio. The immersion time in the decolorization liquid was 30 seconds and the obtained polarizer had an absorbance of 0.380.

(6) The composition of the crosslinking liquid was as follows: water:boric acid:potassium iodine=85:1:0:5 in terms of a weight ratio.

FIG. 4 is a graph of absorbance ($A_C$) versus polarization degree of a polarizer.

Example 6

A laminate composed of a polarizer (thickness: 3.5 μm) and a support was formed in the same manner as in Example 5 except for the following points:

(1) The immersion time in the dyeing liquid was 600 seconds. The absorbance immediately after dyeing was 0.417.

(2) The immersion time in the decolorization liquid was 2 seconds. The obtained polarizer had an absorbance of 0.380.

FIG. 4 is a graph of a graph of absorbance ($A_C$) versus polarization degree of a polarizer.

Example 7

A laminate composed of a polarizer (thickness: 3.5 μm) and a support was formed in the same manner as in Example 5 except for the following points:

(1) An amorphous polyethylene terephthalate film with a thickness of 200 μm (manufactured by Mitsubishi Plastics, Inc., product name: Novaclear SG007) was used as a support.

(2) The stretching temperature was 110° C.

(3) The composition of the dyeing liquid was as flows: iodine:potassium iodine:water=0.2:1.4:98.4 in terms of a weight ratio.

(4) The immersion time in the dyeing liquid was 600 seconds. The absorbance immediately after dyeing was 0.577.

(5) The immersion time in the decolorization liquid was 8 seconds and the obtained polarizer had an absorbance of 0.380.

FIG. 4 is a graph of absorbance ($A_C$) versus polarization degree of a polarizer.

Comparative Example 1

A laminate composed of a polarizer (thickness: 2.9 μm) and a support was formed in the same manner as in Example 1 except for the following points:

(1) The immersion time in the dyeing liquid was adjusted to prepare four kinds of samples of the obtained polarizer having an absorbance of 0.367 to 0.387.

(2) No decolorization process was performed.

FIG. 4 is a graph of absorbance ($A_C$) versus polarization degree of a polarizer. And FIG. 5 is a graph of absorbance ($A_B$) versus polarization degree of a dyed layer.

Comparative Example 2

A laminate composed of a polarizer (thickness: 2.9 μm) and a support was formed in the same manner as in Example 1 except for the following points:

(1) The immersion time in the dyeing liquid was adjusted to prepare four kinds of samples of the obtained polarizer having an absorbance of 0.367 to 0.384.

(2) No decolorization process was performed.

(3) The stretching temperature was 100° C. and the stretch ratio was 4.5 times larger than the original length.

FIG. 4 is a graph of absorbance ($A_C$) versus polarization degree of a polarizer.

Comparative Example 3

A laminate composed of a polarizer (thickness: 3.5 μm) and a support was formed in the same manner as in Example 5 except for the following points:

(1) The composition of the dyeing liquid was as follows: iodine:potassium iodine:water=0.5:3.5:96.0.

(2) The immersion time in the dyeing liquid was 25 seconds. The absorbance immediately after dyeing was 0.395.

(3) No decolorization process was performed.

FIG. 4 is a graph of absorbance ($A_C$) versus polarization degree of a polarizer.

[Evaluation]

FIG. 4 illustrates a graph of absorbance ($A_C$) versus polarizer degree of a polarizer.

(1) Comparing Examples 1 to 3, Example 2, Example 1, and Example 3 are arranged in descending order of reductions in polarization degree caused by decolorization. This is the descending order of absorption reduction caused by decolorization. The reduction of absorption in Example 2 was 0.544 to 0.562. And the reduction of absorption in Example 1 was 0.225 to 0.245. The reduction of absorption in Example 3 was 0.043 to 0.058. It is, therefore, presumed that the difference in polarization degree among Examples 1 to 3 is caused by reductions in absorption caused by decolorization.

(2) The polarization degree in Example 4 is higher than that of Example 3. The stretch conditions of Example 4 are 150° C. and 4.5 times larger than the original length. The stretch conditions in Example 3 are 150° C. and 4.8 times larger than the original length. The stretch conditions are disadvantageous in Example 4. On the other hand, the reduction of absorbance in Example 4 was 0.583 to 0.602. The reduction of absorbance in Example 3 was 0.043 to 0.058. This means that Example 4 is advantageous regarding reductions in absorbance. Since advantageous effects of the reduction in absorbance in Example 4 exceeded disadvantageous effects of the stretch conditions, it is presumed that the polarization degree of Example 4 is higher than that of Example 3.

(3) Stretch conditions in Example 5 are similar to the stretch conditions in Example 6. However, while a reduction in absorbance caused by decolorization is big (0.243) in Example 5, a reduction in absorbance is small (0.037) in Example 6. As a result, it is presumed that there is a difference between Example 5 and Example 6 in polarization degree because of the difference of reduction in absorbance.

(4) The stretching temperature (110° C.) in Example 7 is lower than the stretching temperature (140° C.) in Examples 5 and 6. Therefore, it is presumed to have a low polarization degree in Example 7.

(5) It is presumed that the reason why the polarization degree in Comparative Examples 1, 2, and 3 is low is that the reduction in absorbance caused by decolarization has not been achieved.

FIG. 5 illustrates a graph of the absorbance ($A_B$) versus polarization degree of a dyed layer. The stretch conditions in Examples and Comparative Example are both 150° C. and 4.8 times larger than the original length in this graph. Therefore, this graph simply shows effects of the reduction in absorbance caused by decolorization. This graph plots absorbance when the absorbance ($A_C$) of the polarization degree was set at 0.367. Thus, the higher absorbance of the dyed layer is, there is more reduction in absorbance caused by decolorization. Example 2, Example 1, and Example 3 are arranged in descending order of the more reduction in absorbance caused by decolorization. No decolorizing was performed in Comparative Example 1. As can be seen from the graph, the more the reduction in absorbance occurs, the higher the polarization degree is.

[Measuring Method]

[Absorbance]

An absorbance A was calculated from the following equation (1) by measuring a transmittance T of a sample using a spectrophotometer with integrating sphere (manufactured by MURAKAMI COLOR RESEARCH LABORATORY CO., LTD., product name: Dot-41):

$$A = \log_{10}(1/T) \quad (1)$$

wherein the transmittance T herein means a value of tristimulus value Y of the XYZ colorimetric systems based on a two-degree view field in accordance with the JIS Z 8701 (1995).

[Polarization Degree]

A polarization degree was calculated from the following equation (2) by measuring a parallel transmittance $H_0$ and an orthogonal transmittance $H_{90}$ of a sample using a spectrophotometer with integrating sphere (manufactured by MURAKAMI COLOR RESEARCH LABORATORY CO., LTD., product name: Dot-41):

$$\text{Polarization degree (\%)} = \{(H_0 - H_{90})/(H_0 + H_{90})\}^{1/2} \times 100 \quad (2)$$

Parallel transmittance means a transmittance measured when the two polarizers prepared in the same conditions are laminated so that the transmission axes may be parallel to each other. Orthogonal transmittance means a transmittance measured when the two polarizers prepared in the same manner are laminated such that transmittance axes thereof may be at right angles to each other. The parallel transmittance and the orthogonal transmittance are respectively a value Y of the tristimulus value of the XYZ colorimetric systems based on a two-degree view field in accordance with the JIS Z 8701 (1995).

INDUSTRIAL APPLICABILITY

The polarizer of the present invention is preferably used for liquid crystal display devices such as liquid crystal television units, computer displays, car navigation systems, mobile phones, and game devices or the like.

DESCRIPTION OF THE REFERENCE NUMERALS

10: polyvinyl alcohol-based resin layer; 11: amorphous portion; 12: crystallized portion; 13: arrow indicating a stretch direction; 14: stretched layer; 15: arrow indicating a stretch direction; 16: amorphous portion; 17: crystallized portion; 18: dyed layer; 19: polyiodine ion complex; 20: polarizer; 21: feed portion; 22: stretch roll; 23: dyeing liquid; 24: decolorization liquid; 25: take-up portion; 30: support

The invention claimed is:

1. A polarizer comprising a stretched layer of polyvinyl alcohol-based resin including iodine adsorbed therein;
   wherein said layer of polyvinyl alcohol-based resin has a thickness of 0.4 to 7 μm and includes polymer chains oriented substantially in a given direction being the direction of stretching, said polymer chain including a crystallized portion of polyvinyl alcohol-based resin oriented substantially in said given direction, and said layer of polyvinyl alcohol-based resin surrounding the crystallized portion of said polyvinyl alcohol-based resin is amorphous; and
   wherein said iodine adsorbed in said layer of polyvinyl alcohol-based resin is present in said layer of polyvinyl alcohol-based resin in the form of polyiodine ion complex adsorbed to the crystallized portion of said layer of polyvinyl alcohol-based resin, whereby the polarizer exhibits an absorbance in the range of from 0.3 to 0.4 and said polyiodine ion complex adsorbed to the crystallized portion of said layer of polyvinyl alcohol-based resin provides the polarizer with dichrosim within a visible light range.

2. A polarizer in accordance with claim 1, wherein said polyiodine ion complex is adsorbed to said crystallized portion of said polymer chain in the form of $I_3^-$ or $I_5^-$.

3. A polarizer in accordance with claim 2, wherein said polyiodine ion complex is adsorbed to the said crystallized portion of said polymer chain in a relatively large amount.

4. A polarizer in accordance with claim 1, wherein the said layer of polyvinyl alcohol-based resin has a crystallization degree in the range of from 20 to 50%.

5. A polarizer in accordance with claim 4, wherein the crystallization degree is in the range of from 32 to 50%.

6. The polarizer in accordance with claim 1, wherein the said stretched layer has a thickness in the range of from 0.6 to 5 μm.

7. A laminate of the polarizer in accordance with claim 1 and a support layer whereon the resin layer was formed and that has been stretched with the polyvinyl alcohol-based resin layer.

* * * * *